(12) United States Patent
Lukyanenko et al.

(10) Patent No.: US 12,229,510 B2
(45) Date of Patent: Feb. 18, 2025

(54) NAMED ENTITY RECOGNITION IN CHAT DIALOGUES FOR CUSTOMER RELATIONSHIP MANAGEMENT SYSTEMS

(71) Applicant: PAYPAL, INC., San Jose, CA (US)

(72) Inventors: Nikita Alekseyevich Lukyanenko, San Jose, CA (US); Alexander Shvid, Las Vegas, NV (US)

(73) Assignee: PAYPAL, INC., San Jose, CA (US)

( * ) Notice: Subject to any disclaimer, the term of this patent is extended or adjusted under 35 U.S.C. 154(b) by 587 days.

(21) Appl. No.: 17/463,361

(22) Filed: Aug. 31, 2021

(65) Prior Publication Data
US 2023/0069587 A1 Mar. 2, 2023

(51) Int. Cl.
*G06F 40/279* (2020.01)
*G06F 40/35* (2020.01)

(52) U.S. Cl.
CPC ............ *G06F 40/279* (2020.01); *G06F 40/35* (2020.01)

(58) Field of Classification Search
CPC ....... G06F 40/279; G06F 40/35; G06F 40/295
See application file for complete search history.

(56) References Cited

U.S. PATENT DOCUMENTS

| | | | | |
|---|---|---|---|---|
| 10,891,956 B2* | 1/2021 | Canim | ................... | G06F 16/219 |
| 2014/0297268 A1* | 10/2014 | Govrin | ..................... | G06N 5/02 704/9 |
| 2016/0342911 A1* | 11/2016 | Kannan | ............... | G06Q 10/0631 |
| 2018/0330278 A1* | 11/2018 | Ghajar | .................. | G06F 40/289 |
| 2020/0329144 A1* | 10/2020 | Morgan | ................. | G06N 20/10 |
| 2021/0149901 A1* | 5/2021 | Fonseca de Lima | ........................ | G06F 16/24522 |
| 2021/0209441 A1* | 7/2021 | Sivakumar | ............. | G06N 3/006 |
| 2021/0263972 A1* | 8/2021 | Cooper | ................... | G06F 16/93 |

(Continued)

FOREIGN PATENT DOCUMENTS

| | | | | |
|---|---|---|---|---|
| CN | 107357838 A | * | 11/2017 | ......... G06F 16/3326 |
| EP | 3511887 A1 | * | 7/2019 | ......... G06F 17/2785 |

OTHER PUBLICATIONS

"Comprehensive Technology Function Product Matrix for Intelligent Chatbot Patent Mining," Oscar N.J. Hong*, Usharani Hareesh Govindarajan, Jack Y.C. Chang Chien, Amy J.C. Trappey, 2019 IEEE International Conference on Systems, Man and Cybernetics (SMC), Bari, Italy. Oct. 6-9, 2019 (Year: 2019).*

*Primary Examiner* — Richemond Dorvil
*Assistant Examiner* — Mulugeta Tuji Dugda
(74) *Attorney, Agent, or Firm* — .Haynes and Boone, LLP

(57) ABSTRACT

There are provided systems and methods for named entity recognition in chat dialogues for customer relationship management systems. A service provider, such as an electronic transaction processor for digital transactions, may provide live chat service channels for assistance through live agents and chatbot services. When interacting with these channels, a user may engage in a chat dialogue with live agents. This may include lines of texts corresponding to the exchanged messages and may include named entities for particular types or categories of words that refer to a particular object or thing. To identify these named entities, a natural language processor may utilize machine learning and other engines for named entity recognition in customer relationship management systems to highlight the named entities in live service chats. Agents of the systems may view content that identify the named entities and interact with the named entities to view descriptions.

20 Claims, 8 Drawing Sheets

(56) References Cited

U.S. PATENT DOCUMENTS

| | | | | |
|---|---|---|---|---|
| 2021/0286633 A1* | 9/2021 | Bar-on | ................. | G06Q 10/107 |
| 2022/0156582 A1* | 5/2022 | Sengupta | ............... | G06N 3/042 |
| 2022/0222489 A1* | 7/2022 | Liu | ...................... | G06F 18/214 |
| 2022/0335223 A1* | 10/2022 | Tripathi | .................. | G06F 40/35 |
| 2022/0374602 A1* | 11/2022 | Park | ...................... | G06F 40/295 |

* cited by examiner

300c

HJKL83477 TRANSACTION ID | The shipping number the seller provided you is the same for all 5 orders. UPS [ FGHI9876 ]—324

TRACKING NUMBER | UPS has told me that the shipping address for this

FGHI9876 ~ Delivered (14 Days)—326

Number: 2A4382106
Package status: Delivered (14 Days)
Country: United States --> United States
Destination: ****

NAMED ENTITY RECOGNITION IN CHAT DIALOGUES FOR CUSTOMER RELATIONSHIP MANAGEMENT SYSTEMS

TECHNICAL FIELD

The present application generally relates to intelligent and automated named entity recognition in chat dialogues and more particularly to utilizing natural language processing and machine learning models to identify and tag named entities in chat dialogues.

BACKGROUND

Service providers may have large computing systems and services that provide automated and live agent chat interfaces, and interactions with different end users, such as customers, clients, internal users and teams, and the like. For example, a service provider's computing system may have multiple different divisions and corresponding systems for data processing, storage, and use. However, when different users are utilizing the computing services and operations provided by the service provider, these users may require assistance and/or information, such as when using a user's digital account to perform electronic transaction processing through an online electronic transaction processor. When this occurs, users may interact with live agents via a live chat service and platform. These live chat services may include live agent messaging and chat, automated assistance channels with chatbots, asynchronous chat services, and the like, which may also be accessed through text messaging, emails, push notifications, instant messaging, and other electronic communication channels. However, when the live agents converse with customers or other end users during chat sessions, the chat sessions may have specific words or phrases that refer to important or relevant data. Live agents may be unaware of this data and may be required to search for the data within chat dialogues. Further the live agents are required to identify and lookup the data, such as by submitting database queries and/or executing searches. This takes additional time, requires user inputs, and wastes computing resources when searching texts and executing database queries and searches.

BRIEF DESCRIPTION OF THE DRAWINGS

FIG. 3A-3D are exemplary user interfaces of a chat dialogue having named entities displayed in a chat dialogue using named entity recognition, according to an embodiment;

Figure 1:
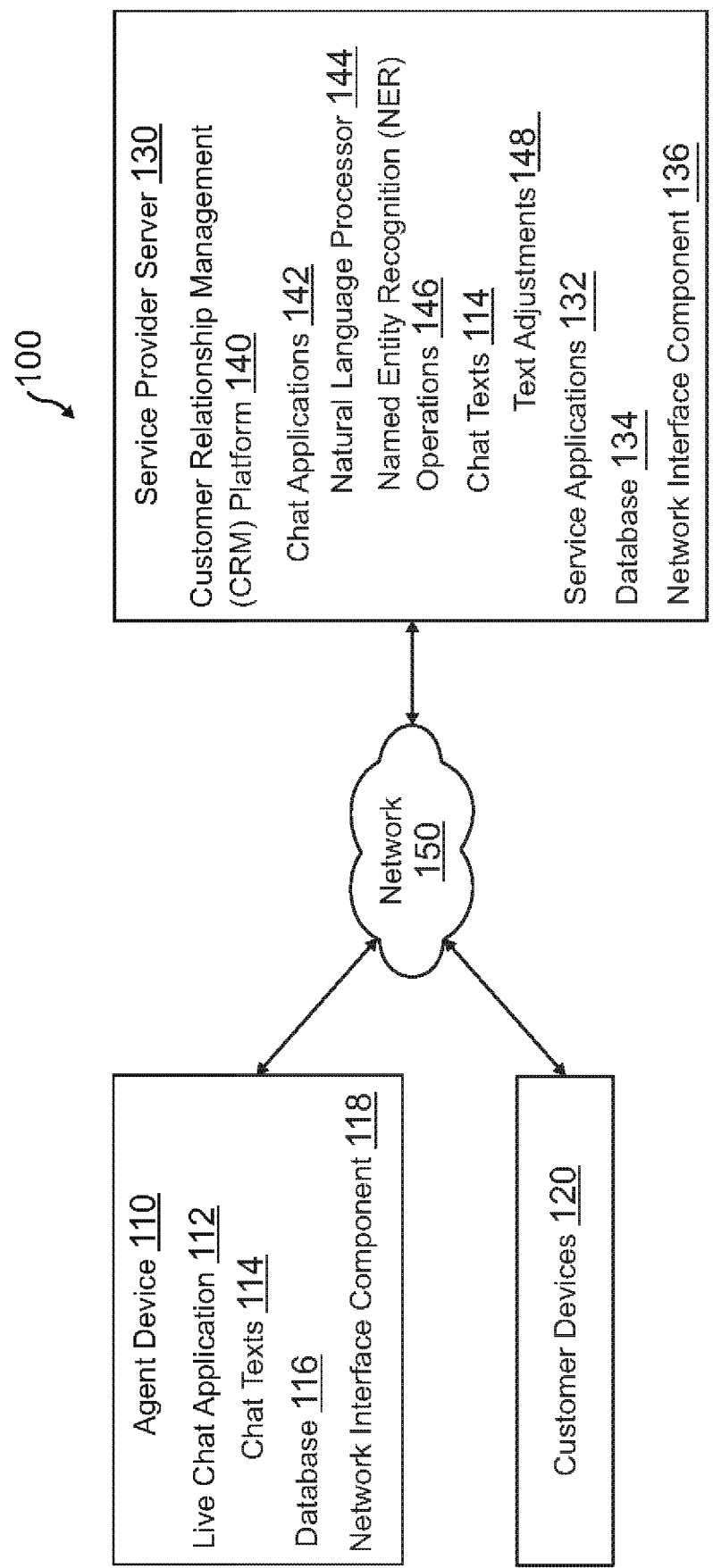
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for named entity recognition in chat dialogues for customer relationship management systems. Systems suitable for practicing methods of the present disclosure are also provided.

In computing systems of service providers, live chat services via chat platforms may include live agents and chatbots for automated help or assistance. The live chat services may be provided via online digital platforms for customer relationship management (CRM) systems that provide assistance, reporting, sales, and the like. In this regard, CRM systems may provide live chat services through dialogues conducted via an email channel, a digital alert channel, a text message channel, a push notification channel, an instant message channel, or other messaging channel. However, other dialogues may also occur asynchronously and without live communications, such as with delayed email communications. Thus, dialogues between users (e.g., customers including merchants and individual users or buyers with an online transaction processor) and live agents or chatbots (e.g., automated computing processes for responding to user requests and conversation) may allow for users of a service provider to engage in assistance options associated with one or more services of the service provider. For example, an online transaction processor may provide live chat assistance for account setup, authentication, account usage (e.g., during electronic transaction processing), mobile device or application usage, payment information and/or service, and the like.

When providing these chat services, dialogues, such as chats, conversations, messages, chat sessions may include multiple sentences or other groups of words that form the text for the dialogue between a live agent and a customer or other user. Some dialogues may be long, and review may take substantial time for live agents to review and identify important data within the dialogue. Thus, the service provider may provide a named entity recognition (NER) operation of a natural language processor (NLP) that may use natural language processing techniques and/or machine learning (ML) models to identify named entities within text of the dialogue. The NER operation may parse the text of the chat dialogue and identify one or more named entities. Once identified, the NER operation may further determine an identifier, type, or other label for the named entity. The labels may be specific to the service provider and/or the type of assistance or channel for the live chat service. With the labels, additional background data, identification data, or another description for the named entities may be determined. Thereafter, the NER operation may highlight, including using different colors for different labels, the named entities, while providing a process to access or display the additional data or description for the named entities with the chat dialogue.

In this regard, a service provider that may provide services to users including electronic transaction processing, such as online transaction processors (e.g., PayPal®), may allow merchants, users, and other entities to process transactions, provide payments, transfer funds, or otherwise engage in computing services. For example, in other embodiments, other service providers may also or instead provide computing services for social networking, microblogging, media sharing, messaging, business and consumer platforms, etc. In order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate and/or process data, which may encounter issues or require users to request help or assistance. In order to provide widely available assistance options, the service provider may therefore wish to provide different live chat services and platforms through different electronic communication channels. When engaging in assistance options and other live chat services, dialogues may be generated, which may correspond to the chat, conversation, messaging, and other exchanged dialogue between a user of the service provider and a live agent assisting the user during a communication session. These communication sessions may include named entities that may be associated with additional data or descriptions, and thus, the service provider may implement an NER operation to highlight and add descriptions to these named entities.

The service provider may provide an NLP that utilizes one or more NER operations to perform NER in chat dialogues that identify, mark, and provide information for named entities within the chat dialogues. A dialogue may correspond to a collection of sentences or other groupings of words, where the words in sentences may be broken into individual words, phrases, and/or specific groups of words (e.g., for names, items, places, etc.). In some embodiments, the dialogue may be limited in size and/or scope, or may include all text, sentences, and/or groups of words in the chat session for the dialogue. In this regard, NER in the dialogue may be used to identify and highlight or otherwise visually mark named entities (e.g., transaction identifiers, dates, amounts, persons, organizations, addresses, etc.) in the dialogue and/or highest scored sentences. NER allows for named entities to be identified, highlights, and/or provided with an option to view additional information of the named entities.

In various embodiments, the NER operations of the NLP may correspond to or be performed using one or more ML models trained for identifying and recognizing named entities within a document or corpus of documents. The document(s) may correspond to the text of the chat dialogue for the current chat session between the user and the live agent. The ML model may be trained using training data, which may correspond to annotated training data having labels identifying different named entities of importance or relevance to the service provider and/or the live chat service for the live agent (e.g., the assistance type of the live chat service that is provided by the live agent). Training data may correspond to data from past chats that may be annotated with labels for different named entities, as well as types for those named entities (e.g., transaction identifiers, dates, amounts, persons, account or user identifiers, organizations, addresses, financial information, etc.). When training the ML model, the training data may be processed to determine input attributes or features, which result in a classification, prediction, or other output associated with identifying words or groups of words (e.g., phrases, proper names, identifiers, etc.) as named entities. This may include training one or more layers having nodes connected by edges for decision making.

In various embodiments, the ML model may further be re-trained and/or adjusted based on feedback. For example, a data scientist may determine whether, based on the input annotated data, the ML model is properly (e.g., to sufficient accuracy) identifying named entities. In some embodiments, the ML model may be trained using ML model algorithms and trainers from spaCy, NLTK, and/or Stanford NER. In some embodiments, the ML model may not be required to be trained and retrained by the service provider specifically. For example, a pretrained ML model and/or an unsupervised ML model may be implemented based on ML model algorithms for text processing and NER to identify generic or preset named entities. In this regard, a pretrained model may previously be trained using more generic data or data that is not specific to the service provider to identify certain types of named entities. In such embodiments, the pretrained model may use similar training data to identify generic (e.g., name, location, company, address, etc.) and/or task specific named entities (e.g., transaction information, financial information, credit card numbers, shipping/billing data, etc.).

Once the ML model(s) is/are trained, the model(s) may be deployed in a production computing environment to provide services for the live agent in the live chat service. The production computing environment may be associated with a CRM system and/or platform that provides the live chat services and connects client computing devices of users with live agents via their agent devices for engaging in chat dialogues. The ML model may be tested prior to deployment, such as in an A/B testing environment, and if properly tested for performance (e.g., an X % accuracy), may then be deployed. Once deployed, the ML model may be used for NER with an NLP of the live chat service. For example, the NLP of the live chat service may provide different natural language processing services including parsing and/or text searching, text summarization, optical character recognition (OCR), text-to-speech, and the like. Using the ML model, the NLP may further provide NER in chat dialogues, such as by identifying named entities in the chat dialogues to an agent when viewed in a user interface of the agent's device (e.g., a chat window or interface displaying a live chat instance or session). For a service provider that is an online transaction processor, these named entities may be associated with transaction, account, and/or payment services and assistance including transaction identifiers, dates, amounts, persons, account or user identifiers, organizations, addresses, financial information.

In various embodiments, the NLP may also utilize a custom configured rule-based engine for linguistic grammar-based techniques for NER. Such engines may utilize processing rules to cleanse text in a chat dialogue and identify named entities. These engines may be used separately from, in conjunction with, and/or as a replacement to ML models trained for NER. In such embodiments, the linguistic grammar-based engine may utilize specific rules and logic to remove portions of speech and/or text that are unimportant or irrelevant to NER and search for specific named entities. This may include rules to identify certain words and/or phrases as identifying a named entity. These engines may be configured for specific tasks and/or types of assistance provided. For example, such an engine may be employed specifically for use in an assistance channel of a service provider for account login.

Once the NER operations are implemented (e.g., the ML model(s) and/or engine), the NLP may receive a chat text for a chat dialogue between a user and a live agent during a live chat session. However, the chat session may also be asynchronous messaging, such as when an agent receives an email and may request viewing of named entities and their corresponding information and/or description in the email. The NLP may then execute the NER operation(s) to identify named entities within the chat text. This may be done by identifying based on the ML model and/or text cleansing and extraction of the NER operation(s). The named entity may correspond to one or more words within sentences or other groups of words in the text of the chat dialogue. A named entity may therefore be recognized by specific words, such as "transaction" or "identifier" preceding a length of alphanumeric characters, a proper noun, capitalization, word and digit constructions identifying an address, use of ".com" with a word, arbitrary or fanciful words, and the like. Thus, each named entity may further be associated with a label or type corresponding to the named entity (e.g., transaction identifiers, dates, amounts, persons, account or user identifiers, organizations, addresses, financial information, etc.). Further, the NLP may perform pre-processing on the text to remove and/or fix typos, shorthand, abbreviations, and the like to avoid identifying common words as named entities.

The chat dialogue may be retrieve from the current chat session, such as from the device and/or CRM platform providing the live chat service to the user. Once the named entities are determined, a corresponding description or other data about the named entity may be retrieved and/or determined. For example, with a transaction identifier, the NER operation(s) may retrieve, from a database or other data storage of the service provider, information regarding the underlying transaction linked to the transaction identifier. Such data may include proprietary data including account information, account standing and/or history, transaction information, risk information, and the like. With other named entities, such as websites, companies, and the like, publicly available information may be retrieved. In this regard, a search engine may be used to execute a search and/or online website and/or webservices may be used to retrieve information for the named entities. For example, PayPal.com may have a website history and/or website good standing information, such as those associated with past fraud, date of establishment, and the like. Public websites for shipping providers may be used to obtain shipping information. Similarly, the corresponding service provider (e.g., PayPal®) may have a merchant or user history whereby data for a named entity that is a client or customer of the service provider may be retrieved and/or determined from the service provider's stored and/or proprietary data. Thus, when a named entity that is also a client or customer of the service provider is stated in a chat dialogue (e.g., "service provider's merchant A utilized your payment services), internal and/or associated databases may be searched to retrieve data for that customer that is particular to that service provider providing assistance in the chat dialogue.

The additional data and/or description may be determined from executing an internal search and/or external search (e.g., using a search engine and/or external data repository) and/or executing internal database searches for internal and/or proprietary data. The description or additional data may be associated with user information, financial information, an online web address, a certificate of standing, a fraud description, a shipping address, a billing address, or an item description. An identifier may be used for the search, which may determine social networking data, financial standing data, web site reputational data, or business data. The selected search may be based on the type or label for the named entity. For example, transaction identifiers may be searched with internal databases, while companies may be externally searched.

Once the named entities and additional information or descriptions are determined, one or more highlights, tags, identifications, or other marks may be generated and used to identify the named entities within the chat dialogue. The highlights may be added to the chat dialogue as presented in a chat interface in a user interface of the agent's computing device. This may include using different color highlighting or marking for different types or labels of named entities. Further, when presenting the highlighting, an option may be added and/or displayed that allows for retrieval of the description and/or additional data for the named entity. For example, the agent may move a mouse cursor over and/or select the highlighting of the named entity to view this data. A menu option and/or drop-down menu nearby or in another interface window or element may allow for viewing of the data for the named entity. In some embodiments, all named entities may be listed with the chat dialogue in the user interface, and the named entities may be selected to view in the chat dialogue and/or view the data for the named entities.

The live agent may further provide feedback of whether named entities were relevant or not relevant and helpful in the dialogue. Based on the feedback, the NER operations of the NLP may hide or display the named entities in the user interface or window of presented to the agent. Further, the live agent, an administrator, and/or a data scientist may tune a number or frequency of identification of named entities in the chat dialogue using the NER operation(s). To reduce noise, the NER operation(s) may be tuned to show less named entities and/or remove display of specific types of named entities. However, where more data is required, the NER operation(s) may be tuned to display more named entities and/or additional categories or types of named entities may be added to NER for the NLP.

In this manner, the service provider's system for automated NER may expedite the generation and display of named entities, with their additional data and descriptions, in live chat dialogue during chat sessions. User interfaces may be output and updated automatically to display relevant data that may assist live agents in providing services. This may be performed in real-time as chat dialogue is incoming and new text is presented to the live agent. For example, it may be difficult and/or uninteresting to read large blocks of black and white text, but the highlights in the text via the NER may assist an agent and focus on key parts of the conversation. Further, if an agent needs particular data and/or a status of the data, the NER and color or pattern coding allows ease of scrolling through text and/or searching for that data. Thus, the NER operations provide labor automation for the agents and other users viewing the chat dialogue and allow for simplified selection and navigation through data. This may be utilized in different types of chat dialogues including medical conversations in the medical field to quickly find and identify medical data. Thus, the highlights and data for named entities may be generated quickly, without user input, and in more widely deployed chat services in different computing channels. Furthermore, a simplified interface may be provided to view, select, and interact with named entities from different channels without requiring coding translation and/or executing searches by users. By reducing the coding input and manual inputs, computing resources required for individual live agent devices may be reduced.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments.

Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes an agent device 110, customer devices 120 and a service provider server 130 in communication over a network 150. Customer devices 120 may be utilized by a user, customer, or entity to access a computing service or resource provided by service provider server 130, where service provider server 130 may provide various data, operations, and other functions to customer devices 120 via network 150. In this regard, customer devices 120 may be used to engage in live chat services to engage in chat dialogues with agent device 110. Service provider server 130 may determine named entities in the chat dialogues and may present those within a user interface of agent device 110 displaying the chat dialogues.

Agent device 110, customer devices 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Agent device 110 may be implemented as a communication device that may utilize appropriate hardware and software configured for wired and/or wireless communication with customer devices 120 and/or service provider server 130. For example, in one embodiment, agent device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Agent device 110 of FIG. 1 contains a live chat application 112, a database 116, and a network interface component 118. Live chat application 112 may correspond to executable processes, procedures, and/or applications with associated hardware. In other embodiments, agent device 110 may include additional or different modules having specialized hardware and/or software as required.

Live chat application 112 may correspond to one or more processes to execute modules and associated devices of agent device 110 to provide a convenient interface to permit a user for agent device 110 (e.g., a live agent, although chatbots may also converse with customer devices 120) to utilize live services of service provider server 130 to communicate with users utilizing customer devices 120. Where service provider server 130 may correspond to an online transaction processor, the services provided to agent device 110 may correspond to CRM services and systems, such as those that provide assistance via live chat service with agents and/or chatbots. For example, live chat application 112 may be used to access a live chat service provided by a CRM platform 140 provided by service provider server 130, as discussed herein. In further embodiments, different live chat services may be provided via live chat application 112, such as those associated with messaging, social networking, media posting or sharing, microblogging, data browsing and searching, online shopping, and other services available to users, customers, and the like of service provider server 130.

In this regard, when engaging in chats, conversations, and other dialogues with users utilizing customer devices 120, live chat application 112 may be used to request, receive, and/or display chat texts 114 for one or more chat dialogues during one or more chat sessions with such users. Chat texts 114 may be engaged in via service provider server 130 when one or more of customer devices 120 engage CRM platform 140 of service provider server 130 to request assistance from agent device 110. In this regard, chat texts 114 may be further presented with named entities from NER performed by service provider server 130, as discussed herein. Chat texts 114 with NER are output to the live agent of agent device 110 for use during one or more chat sessions having dialogues between the user(s) and the agent of agent device 110. Chat texts 114 with NER may be output in a user interface, window, pop-up, or the like with or in association with chat texts 114. Live chat application 112 may further be used to interact with named entities from NER in chat texts 114, as well as tune or adjust the NER to reduce noise or increase amounts and/or types of named entities provided by the NER operations of service provider server 130.

In various embodiments, live chat application 112 may correspond to a general browser application configured to retrieve, present, and communicate information over the Internet (e.g., utilize resources on the World Wide Web) or a private network. For example, live chat application 112 may provide a web browser, which may send and receive information over network 150, including retrieving website information, presenting the website information to the user, and/or communicating information to the website. However, in other embodiments, live chat application 112 may include a dedicated software application of service provider server 130 or other entity (e.g., a merchant) resident on agent device 110 (e.g., a mobile application on a mobile device) that is displayable by a graphical user interface (GUI) associated with live chat application 112.

Agent device 110 may further include database 116 stored on a transitory and/or non-transitory memory of agent device 110, which may store various applications and data and be utilized during execution of various modules of agent device 110. Database 116 may include, for example, identifiers such as operating system registry entries, cookies associated with live chat application 112, identifiers associated with hardware of agent device 110, or other appropriate identifiers, such as identifiers used for payment/user/device authentication or identification, which may be communicated as identifying the user/agent device 110 to service provider server 130. Moreover, database 116 may include chat information for chat texts 114, as well as NER data including named entities, highlights, coloring, shading, descriptions, and/or additional data.

Agent device 110 includes at least one network interface component 118 adapted to communicate with customer devices 120 and/or service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Customer devices 120 may be implemented as communication and/or computing devices that may utilize appropriate hardware and software configured for wired and/or wireless communication with agent device 110 and/or service provider server 130. For example, in one embodiment, customer devices 120 may be implemented as one or more of a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although a plurality of devices are shown, a single device may function similarly to communicate with agent device 110 and/or service provider server 130, as described herein.

Customer devices 120 may include executable processes, procedures, and/or applications with associated hardware to communicate with service provider server 130. For example, customer device 120 may engage with CRM platform 140 to request assistance and/or engage in live chat services with CRM platform 140. This may include chat sessions between customer devices 120 with live agent device 110, where live agent device 110 provides services or assistance through live chat application 112 that is facilitated using CRM platform 140. Thus, customer devices 120 may include convenient interfaces to permit users for customer devices 120 to utilize services of service provider server 130 including live chat services and other communication services when conversing with live agents of service provider server 130. When requesting chat services, customer devices 120 may engage in chat sessions that generate chat dialogues having chat text 114 presented on agent device 110. Chat text 114 may correspond to text, images, audiovisual content, voice, and the like, which may correspond to chat sessions where NER is provided, as discussed herein. Customer devices 120 may further includes network interface components adapted to communicate with agent device 110 and/or service provider server 130. These network interface components may include one or more of a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide live chat services with live agents and automated chatbots in electronic communication channels. In this regard, service provider server 130 includes one or more processing applications which may be configured to interact with customer devices 120 to provide user interfaces for chat services on customer devices 120, as well as facilitate those chat services between customer devices 120 and agent device 110. The chat services may be for CRM platform 140 that provide assistance and customer services for an online transaction processor corresponding to service provider server 130. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes CRM platform 140, service applications 132, a database 134, and a network interface component 136. CRM platform 140 and service applications 132 may correspond to executable processes, procedures, and/or applications with associated hardware. In other embodiments, service provider server 130 may include additional or different modules having specialized hardware and/or software as required.

CRM platform 140 may correspond to one or more processes to execute modules and associated specialized hardware of service provider server 130 to provide a CRM or other service platform to engage with one or more live agent and/or automated chatbot service options of service provider server 130. In this regard, CRM platform 140 may correspond to specialized hardware and/or software used by service provider server 130 to allow for generating of text adjustments 148 for chat texts 114, such as NER within chat texts 114 that designates and provides additional data and descriptions for named entities. This may cause output of text adjustments on agent device 110 for review with chat texts 114 when communicating via chats, communications, or messages by users associated with customer devices 120 using CRM platform 140. In this regard, CRM platform 140 may include chat applications 142 and a natural language processor (NLP) 144. Chat applications 142 may correspond to one or more applications and/or electronic communication platforms that may allow customers and other end user of service provider server 130 to communicate with live agents and/or chatbots provided by service provider server 130. In this regard, chat applications 142 may be provided by CRM platform 140 for customer relations and the like. In other embodiments, chat applications 142 may also be provided for use with other types of services, including social networking, microblogging, media sharing, messaging, etc. Chat applications 142 may provide communication via an email channel, a digital alert channel, a text message channel, a push notification channel, an instant message channel, or other messaging platform.

Chat applications 142 may provide live chat services with live agents and chatbots such that a user, such as the user associated with customer devices 120, may communicate over those chat services to receive real-time assistance and/or responses (or in some cases delayed assistance and responses, where not live chat, such as asynchronous or offline communication exchanges). These chat services may generate chat dialogues during one or more live chat sessions. These chat dialogues correspond to the current and existing chat sessions, but past asynchronous chat sessions may also be revisited by agents and administrators so that NER operations described herein may also be provided in asynchronous and/or past chat dialogues on CRM platform 140. Since chat dialogues may include different named entities, each with their corresponding data and/or description, agents may spend significant time, computing resources on searches and user input, and network bandwidth/resources attempting to identify the named entities and retrieve the data and/or descriptions of those entities. In order to provide identification and data retrieval for named entities, CRM platform 140 may utilize NLP 144 having named entity recognition (NER) operations 146. NLP 144 may execute one or more ML models and/or rule-based engine for NER operations 146 to generate text adjustments 148 for chat texts 114 from chat dialogues between users and chat applications 142.

In various embodiments, NLP 144 includes one or more ML models for NER operations 146 that may be used for intelligent decision-making and/or predictive outputs and services, such as during the course of providing chat summarization services for dialogues between end users, customers, entities, and the like with live agents and chatbots via CRM platform 140. Thus, the ML model(s) for NER operations 146 may provide a predictive output, such as a score, likelihood, probability, or decision, associated with NER in chat dialogue. NER operations 146 may employ one or more models that may be trained and configured, such as using one of spaCy, NLTK, and/or Stanford NER. However, other ML model algorithms, trainers, and/or training platforms may be used. The training data may include annotated training data from service provider server 130, including proprietary data, that identifies certain NERs. The training data may include past text from chat dialogues between agents and users, which may be annotated with labels for named entities. However, in other embodiments, pretrained ML models and the like may be used for NER operations 146.

For example, the ML model(s) may include ML or neural network (NN) models trained for intelligent decision-making and/or predictive outputs (e.g., scoring, comparisons, predictions, decisions, classifications, and the like) for particular uses with computing services provided by service provider server 130. When building the ML model(s), training data may be used to generate one or more classifiers and provide recommendations, predictions, or other outputs based on those classifications and an ML or NN model algorithm and/or trainer. The training data may be used to determine input features or attributes and utilize those features to generate ML models having decision trees or other decision-making architectures based on the features. For example, the ML model(s) may include one or more layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models for the ML model(s), for example, using feature or attribute extraction with training and other related data.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML model(s) that provide an output, classification, prediction, or the like. Thus, when the ML model(s) are used to perform a predictive analysis and output, the input may provide a corresponding output based on the classifications trained for the ML model(s).

The ML model(s) may be trained by using training data and a feature extraction of training features. By providing training data to train the ML model(s), the nodes in the hidden layer may be trained (adjusted) such that an optimal output (e.g., a classification) is produced in the output layer based on the training data. By continuously providing different sets of training data and penalizing the ML model(s) when the output of the ML model(s) is incorrect, the ML model(s) (and specifically, the representations of the nodes in the hidden layer) may be trained (adjusted) to improve its performance in data classification. Adjusting the ML model(s) may include adjusting the weights associated with each node in the hidden layer. Thus, the training data may be used as input/output data sets that allow for the ML model(s) to make classifications based on input attributes and features extracted from the training data. The output classifications for an ML model trained may be classifications and/or predictions resulting from features of further input data to the ML model.

Once trained, a production computing environment may utilize the ML model(s) for NER operations to perform intelligent decision-making and predictive outputs for NER in chat texts 114. In other embodiments, rule-based engines may be used based on linguistic grammar-based techniques for NER. This may include specific rule-based operations to remove portions of speech, identify specific names, nouns, and/or phrases for named entities, looks for other words and identify named entities within a distance, employ semantic and/or syntax-based rules, and the like. These engines may be task-specific and thus may be employed for certain types of CRM chat services. Thus, the rule-based engines may also be employed in tandem, separately, or in place of the ML model(s).

When executing the ML model(s) for NER in chat texts 114, NLP may obtain chat texts 114 from live chat services during chat sessions. For example, a chat text for a particular chat session occurring between agent device 110 and one of customer devices 120 may be input to NLP 144 for processing by NER operations 146. This may occur live while the chat dialogue and text is incoming and therefore NER operations 146 may provide real-time NER within the chat dialogue so that named entities and their data and/or descriptions are output with the chat dialogue on agent device 110 in live chat application 112. NER operations 146 may seek to identify mentions of rigid designators, which may correspond to words, groups or words, phrases, or other text that specifically corresponds to a particular semantic type. For example, NER operations 146 may identify words, groups of words, phrases, and or text for transaction identifiers, dates, amounts, persons, account or user identifiers, organizations, addresses, financial information.

NER operations 146 may therefore parse and process chat texts 114 to predictively output one or more named entities in chat texts 114. Using the named entities, database queries, online searches, and other data retrieval mechanisms may be executed to determine additional data for the named entities. This may include a description or other background information for the named entities that may be relevant to agents when viewing the named entities. Examples of these descriptions are shown in more detail with regard to FIGS. 3A-3D. The data may be retrieved from internal and/or secure databases for service provider server 130, such as proprietary database and data for an online transaction processor, as well as account, user, device, and/or other entity data. Further, the data may be searched over a network, including the Internet, using one or more search engines, public websites, available data resources, scraped data from social networking or microblogging, and the like.

Thereafter, NER operations 146 may generate test adjustments 148 having markings, shading, or highlighting that specifically identifies the named entities in chat tests 114. For example, the highlighting for text adjustments may correspond to a color, pattern, or shading that causes the named entities to stand out in chat texts 114. With the highlighting, text adjustments 148 for the named entities may be shown, or may be interacted with to show, a description of the named entity from the data. For example, hovering over and/or selecting a named entity may cause the description to populate in a user interface of agent device 110 using text adjustments 148. Text adjustments 148 may further display the named entities in another window or field for interaction and/or search. The user interface of live chat application 112 may also be provided with a feedback option from text adjustments 148 for use with the named entities in chat texts 114.

Service applications 132 may correspond to one or more processes to execute modules and associated specialized hardware of service provider server 130 to process a transaction or provide another service to customers or end users of service provider server 130, which may have live chat services and assistance channels provided by CRM platform 140. In some embodiments, service applications 132 may correspond to specialized hardware and/or software used by a user associated with customer devices 120 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. The payment account may be accessed and/or used through a browser application and/or dedicated payment application executed by customer devices 120 and engage in transaction processing through service applications 132. Service applications 132 may process the payment and may provide a transaction history to customer devices 120 for transaction authorization, approval, or denial. However, in other embodiments, service applications 132 may instead provide different computing services, including social networking, microblogging, media sharing, messaging, business and consumer platforms, etc. Thus, the live service assistance options provided by CRM platform 140 for the services of service applications 132 may include other assistance provided through electronic communication channels.

Service applications 132 as may provide additional features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including one or more GUIs and the like, configured to provide an interface to the user when accessing service provider server 130, where the user or other users may interact with the GUI to more easily view and communicate information. In various embodiments, service applications 132 may include additional connection and/or communication applications, which may be utilized to communicate information to over network 150.

Additionally, service provider server 130 includes database 134. Database 134 may store various identifiers associated with customer devices 120. Database 134 may also store account data, including payment instruments and authentication credentials, as well as transaction processing histories and data for processed transactions. Database 134 may store financial information and tokenization data, as well as transactions, transaction results, and other data generated and stored by service applications 132. Further, database 134 may include dialogues and other chat data, including text, images, audiovisual content, and the like from chat sessions. In this regard, chat texts 114 and/or text adjustments 148 may be stored by database 134 for later use, such as for training data and the like.

In various embodiments, service provider server 130 includes at least one network interface component 136 adapted to communicate with agent device 110 and/or customer devices 120 directly and/or over network 150. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
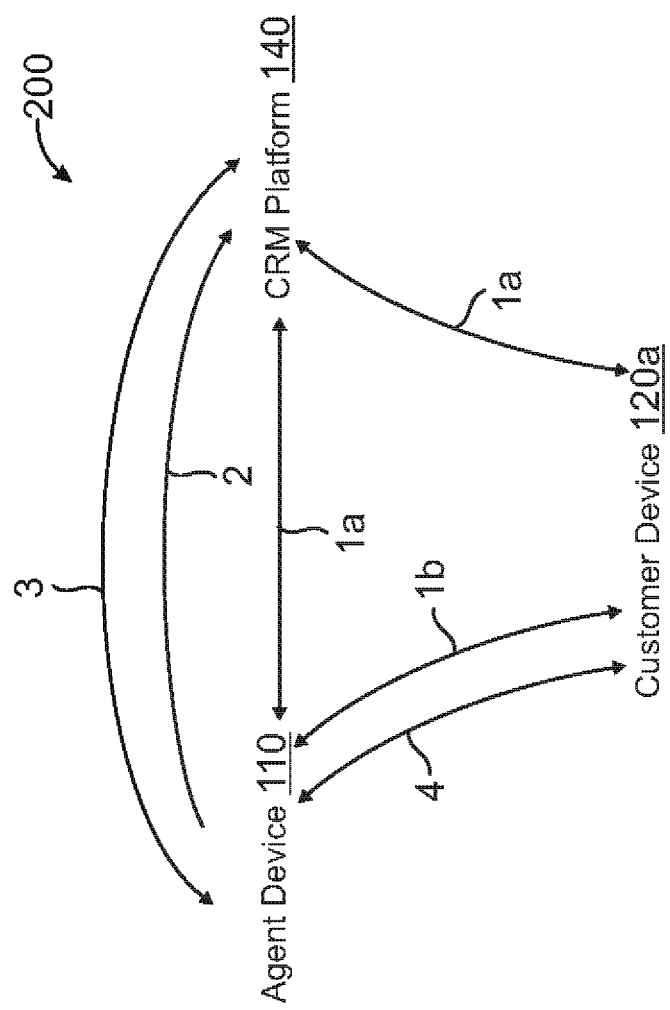
FIG. 2 is an exemplary system environment displaying interactions between an agent device, a customer device, and a customer relationship management platform when identifying named entities in a chat dialogue using named entity recognition, according to an embodiment.

FIG. 2 is an exemplary system environment 200 displaying interactions between an agent device, a customer device, and a customer relationship management platform when identifying named entities in a chat dialogue using named entity recognition, according to an embodiment. System environment may include interactions for data processing between agent device 110, a customer device 120*a* corresponding to one of customer devices 120, and CRM platform 140 discussed in reference to system 100 of FIG. 1. In this regard, CRM platform 140 may facilitate communications between agent device 110 and customer device 120*a* in a CRM system, which may include chat dialogue having or annotated using NER.

In system environment 200, initially customer device 120*a* may communicate with CRM platform 140 at an interaction 1*a*. The communication between customer device 120*a* and CRM platform 140 may correspond to a request for service or assistance from CRM platform 140. Thus, at interaction 1*a*, CRM platform 140 may further route the request to agent device 110 for handling. This may include connecting a web or application chat session to agent device 110. At an interaction 1*b*, which may occur simultaneously and/or in short succession, agent device 110 and customer device 120*a* are connected in order to converse and communicate for the services and/or assistance provided by CRM platform 140.

During interaction 1*b*, conversation may occur between a live agent for agent device 110 and the customer or other user using customer device 120*a*. This may correspond to a chat dialogue having text from the chat session established during interactions 1*a* and 1*b*. During this conversation, agent device 110 may request, and/or CRM platform 140 may implement, NER for named entities in the chat dialogue. In this regard, at an interaction 2, agent device 110 may interact with CRM platform 140 to initialize NER operations for the chat dialogue. This may include providing the chat dialogue and/or requesting that the chat dialogue routed through CRM platform perform NER operations to identify named entities and retrieve descriptions and other data for the named entities. Thus, at interaction 2, CRM platform utilizes text of the chat dialogue, as well as one or more ML models and/or rule-based engines, to perform NER on the text from the chat dialogue.

This may output one or more named entities in the chat dialogue. CRM platform 140 may further execute queries, searches, database lookups, and other data retrieval operations to obtain descriptions and other data for the named entities. CRM platform 140 may use internal and/or external data resources to obtain the data, and may further format, process, or translate the data into a data format and/or structure usable in an interface for a description of the named entities. At an interaction 3, the named entities are then highlighted or otherwise marked up in a user interface displaying the chat dialogue on agent device 110. This may include presenting a highlighting over the named entities with an interface element and/or process to display the description of each named entity when the agent interacts with that interface element and/or named entity.

During interaction 3, additional text for the chat dialogue may be incoming. For example, the agent and the user may continue conversing, and thus additional text is transmitted by customer device 120a and/or input by the agent using agent device 110. Thus, as additional text data is received and added to the chat dialogue, CRM platform 140 may provide real-time NER for the additional data and continue identifying named entities while retrieving their descriptions and additional data. Thereafter, the additional named entities may be populated in the user interface with the chat dialogue on agent device 110. At an interaction 4, agent device 110 may interact with customer device 120a to provide assistance and/or services. This may include providing assistance and/or services using the named entities and/or descriptions from the named entities. Thus, at interaction 4, NER outputs within a chat dialogue may be used during the dialogue with customer device 120a.

FIG. 3A-3D are exemplary user interfaces 300a, 300b, 300c, and 300d of a chat dialogue having named entities displayed in a chat dialogue using named entity recognition, according to an embodiment. User interfaces 300a-300d of FIGS. 3A-3D include information displayed by agent device 110 from system 100 of FIG. 1 when accessing a live chat service and application. Agent device 110 may be used to access one of chat applications 142 provided by CRM platform 140 of service provider server 130 in system 100.

Figure 3A:
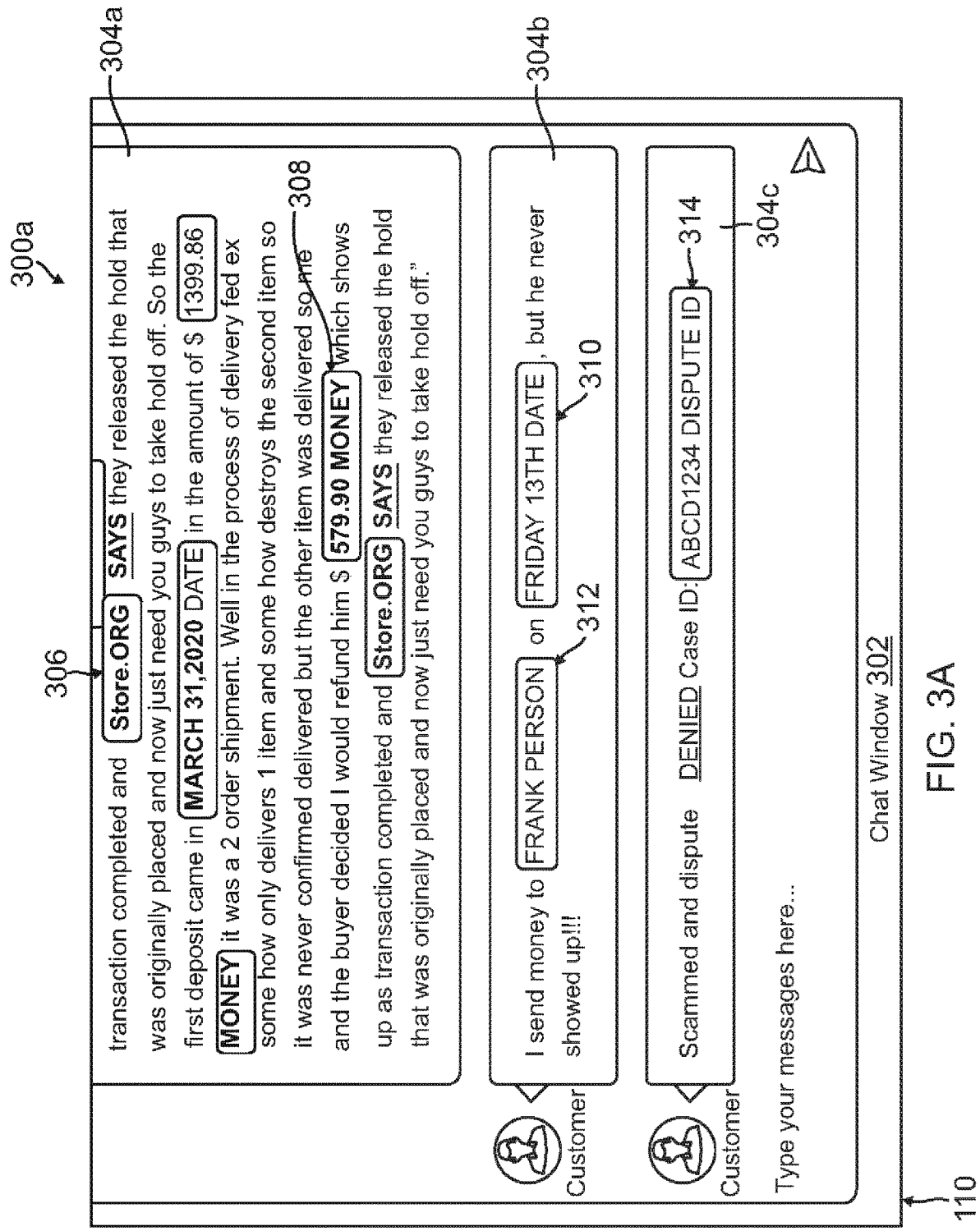

User interface 300a in FIG. 3A may correspond to an application interface, webpage interface, or the like that allows agents or other users associated with a service provider to request and/or view a chat window 302 before or during a chat session or other communications with a user. Chat window 302 may be presented on agent device 110 and may display, through a GUI or other user interface of agent device, a chat dialogue having chat messages 304a, 304b, and 304c. In this regard, chat window 302 may correspond to an interface of an application, such as live chat application 112, that connected with a CRM platform and one or more computing devices of customers or other end users seeking assistance. Thus, a customer may provide chat messages 304a-304c to the live agent viewing chat window 302 to request assistance or another service.

In this regard, chat messages 304a-304c include different named entities, which may be determined by one or more ML models and/or rule-based engines. In chat message 304a, a website named entity 306 and an amount named entity 308 are shown. Website named entity 306 may be identified by Top Level Domains (or TLDs), such as ".org", or ".com", ".gov", ".edu", and the like in other embodiments, as well as a website identifier. Amount named entity 308 may be identified based on having a "$" or other currency identifier, as well as an amount in a standard format, such as by separating amounts in the form of X.XX or X,XX. Amount named entity 308 is further shown with "MONEY" in user interface 300a as a named entity type identifier that denotes amount named entity 308 is for money or an amount of funds. This named entity type identifier for amount named entity 308 may be automatically populated when determining amount named entity 308 is for money or funds. However, the identifiers may also be hidden and/or may be toggleable in order to display the identifiers or remove based on preferences by an agent, employee, administrator, or other user. Further, the named entity type identifiers in user interface 300a may be displayed with different colors, patterns, and/or other visual indicators to identify a type of the corresponding named entity.

In chat message 304b, a date named entity 310 and a person named entity 312 are shown. Date named entity 310 may be identified by using common date constructions and/or by using names or numbers for days of the week, months, years, and the like. Date named entity 310 similarly shows "DATE" as a named entity type identifier and person named entity 312 shows "PERSON" as a named entity type identifier, which similarly may be displayed, hidden, and/or toggleable in the manner described above for amount named entity 308. Person named entity 312 may be determined using a standard construction of names and/or by identifying certain names or portions of names as identifying people (e.g., common first or surnames, etc.). Further, in chat message 304c, a transaction identifier named entity 314 is shown with a "DISPUTE ID" identifier for the type of named entity, which may be identified and determined based on transaction identifier strings and generation algorithms used by the service provider for transaction identifiers. In this regard, the transaction identifier may be proprietary and may be specific to the service provider. However, other common identifiers may also be pretrained, such as SKUs, MCC, and the like. Each of these named entities may be determined by NER operations of a NLP, as discussed herein.

Figure 3B:
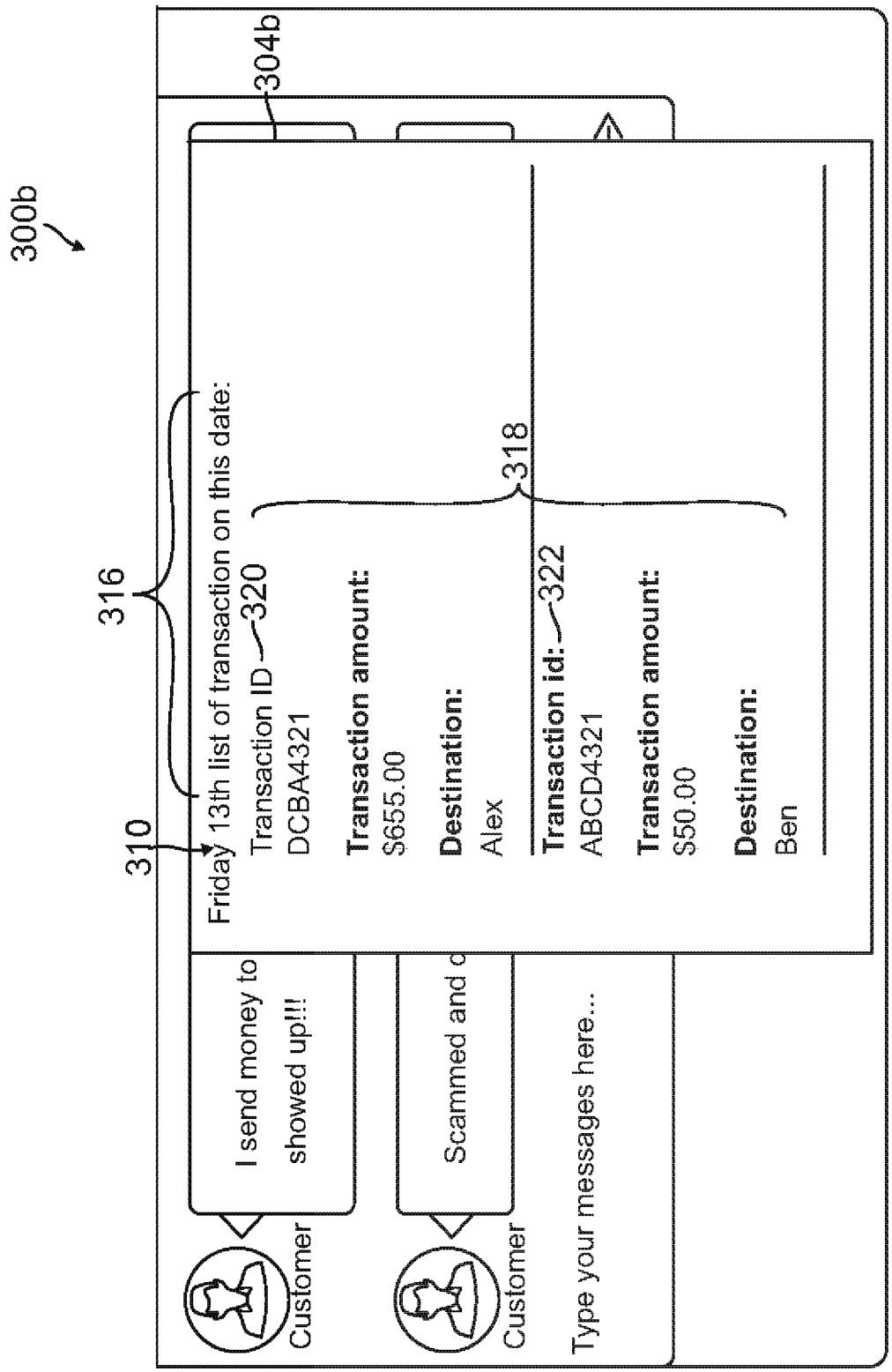

In user interface 300b shown in FIG. 3B, a specific display of a named entity from a chat dialogue is shown. For example, in chat message 304b, date named entity 310 is selected within the corresponding user interface for chat window 302. In response to interaction with and/or selection of a part of the chat dialogue (e.g., hovering a mouse over, clicking on, requesting display from a drop-down menu or option, etc.), a description having a list of data is loaded within interface 300b. The description allows for the agent viewing user interface 300b to view more information about date named entity 310, which may be specific to the user engaged in the chat dialogue and the corresponding assistance. For example, the description loaded for date named entity 310 includes a transaction list 316. Transaction list 316 may display all transactions for the user on the date for date named entity 310. Thus, transaction history 318 displays two transactions for the user and/or user's account on that data. This includes a first transaction 320 and a second transaction 322. First transaction 320 and second transaction 322 allow the agent to provide more detailed, informative, and specific service to the user.

In user interface 300c shown in FIG. 3C, a display of another named entity from a chat dialogue is shown. In the chat dialogue displayed in user interface 300c, a tracking number named entity 324 is shown. Tracking number named entity 324 may correspond to a shipping tracking number with a shipping provider, which may provide a public website or portal in order to look up tracking numbers and determine corresponding data for shipping of a parcel. This may include shipping for purchases processed using an online transaction processor. When interacting with tracking number named entity 324, a tracking description 326 may be displayed in user interface 300c. Tracking description 326 may include data retrieved and/or searched using the website of the shipping provider, and may display shipping data 328 having information regarding the shipping, delivery, and status of the corresponding parcel. This allows an agent to quickly find and review shipping information when conversing with a customer in a chat, which is accomplished by highlighting tracking number named entity 324 and populating tracking description 326 in response to an interaction by the agent.

Figure 3D:
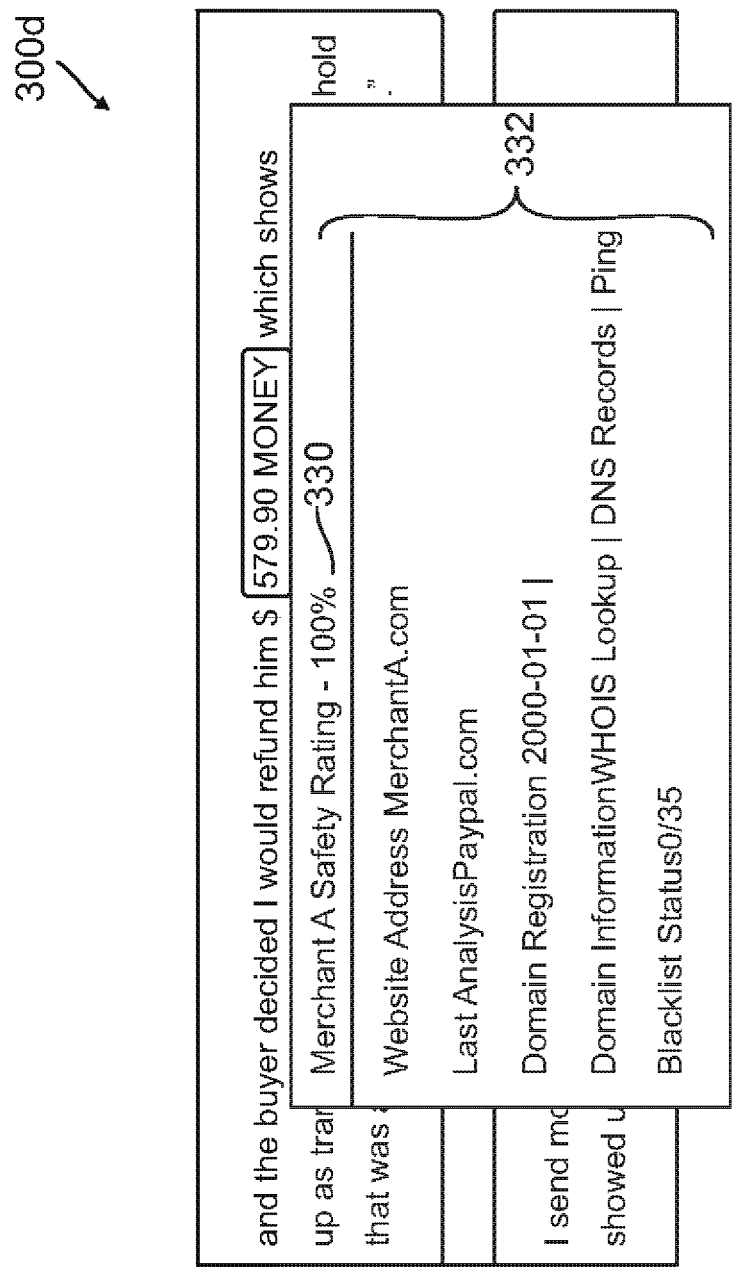

In user interface 300d shown in FIG. 3D, a display of another named entity from a chat dialogue is shown. In the chat dialogue displayed in user interface 300d, a merchant website named entity (not shown) has been interacted with and/or selected. The merchant website named entity may be obscured when viewing a merchant website description 330, however, in other embodiments, merchant website description 330 may be moved or otherwise placed to allow viewing of the corresponding named identifier and/or text within the chat dialogue. Further, merchant website description 330 may be displayed in a text bubble or the like, which may be movable in user interface 300d. In merchant website description 330, merchant website data 332 is shown, which includes safety ratings, blacklists, and the like. This may assist an agent in making fraud decisions and/or providing information about potential fraud during the chat dialogue to the user.

Figure 4:
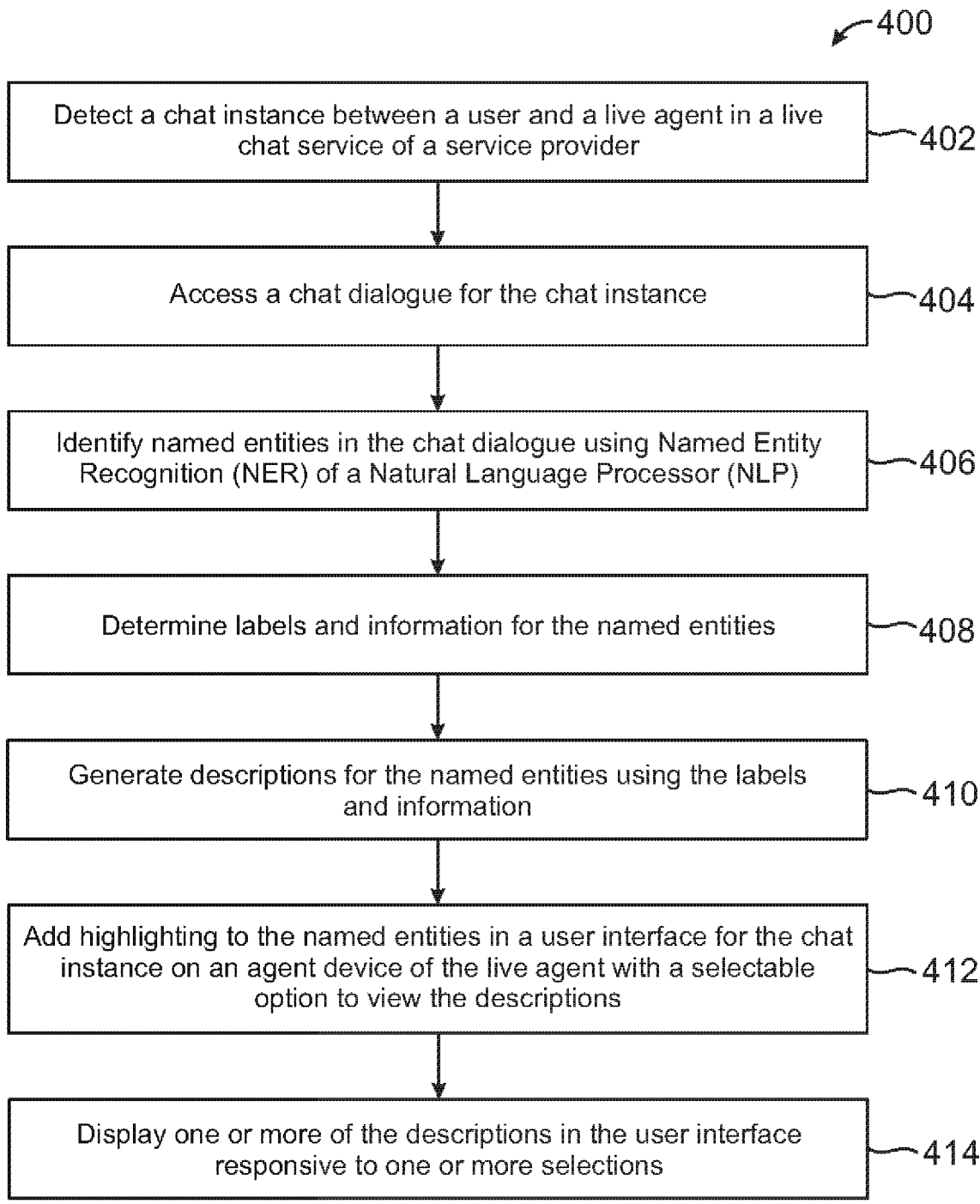
FIG. 4 is a flowchart for named entity recognition in chat dialogues for customer relationship management systems, according to an embodiment.

FIG. 4 is a flowchart 400 for named entity recognition in chat dialogues for customer relationship management systems, according to an embodiment. Note that one or more steps, processes, and methods described herein of flowchart 400 may be omitted, performed in a different sequence, or combined as desired or appropriate.

At step 402 of flowchart 400, a chat instance between a user and a live agent is detected in a live chat service of a service provider. The chat instance may correspond to a chat or communication session that includes a chat dialogue between the user and the live agent and includes text corresponding to the messages exchanged between the parties. The chat instance may occur through a CRM platform, which may provide services to users of a service provider including assistance and help via live agents. In this regard, the text includes words, groups of words, and sentences, which may further include specifically named entities or other semantic types within the chat dialogue. After detecting, a chat dialogue for the chat instance is accessed, at step 404. This may be accessed from a CRM platform and/or agent device of the live agent for the service provider.

At step 406, named entities are identified in the chat dialogue using NER of a NLP. The NLP may utilize one or more ML models and/or rule-based engines to perform the NER with chat text by identify named entities using one or more trained, pretrained, and/or unsupervised ML models that process input text and outputs predictions and/or classifications of words and/or phrases as named entities, including a type or label of the named entities. Similarly, a rule-based engine may utilize rules to identify words and/or phrases in the text. Once identified, at step 408, labels and information for the named entities are determined. Labels may correspond to types of the named entities, such as name, address, company, location, etc. With regard to service providers, the labels may be types associated with transaction identifiers, dates, amounts, persons, account or user identifiers, organizations, addresses, financial information, etc. The information for the named entities may correspond to searchable or retrievable data that further describes the named entities. Thus, the information may correspond to descriptions that may be generated of the named entities identified in the chat dialogue using the NER of the NLP.

At step 410, descriptions for the named entities are generated using the labels and the information. The descriptions may correspond to a specific data layout or format of information that is relevant or useful for the specific type of the named entities based on their corresponding labels. For example, with a person label, a description may include their account name or number, a transaction history, a home or work location, a contact address, or the like. With a transaction identifier label, a description may include transaction information, item purchase and/or shipping information, other transaction participant information, and the like. Thus, the descriptions may be provided with the named entities to further describe such entities.

At step 412, highlighting is added to the named entities in a user interface for the chat instance on an agent device of the live agent with a selectable option to view the descriptions. Highlighting may include adding an element or visual in a user interface displaying the chat dialogue in the chat instance to the named entities. Further, the highlighting may be different for different labels and types of the named entities. The highlighting or other visual may be interactable, such as by hovering over, selecting, and/or requesting display of the descriptions. At step 414, one or more of the descriptions is displayed in the user interface responsive to one or more selections. The description(s) may be displayed in a pop-up, inlaid window, text bubble, menu, or the like, which may be displayed along with a corresponding named entity and/or the chat dialogue. Further, the agent may interact with a description, such as by copying and/or sending data in the description and/or providing feedback of whether the description is relevant or useful, or whether additional data should be fetched.

Figure 5:
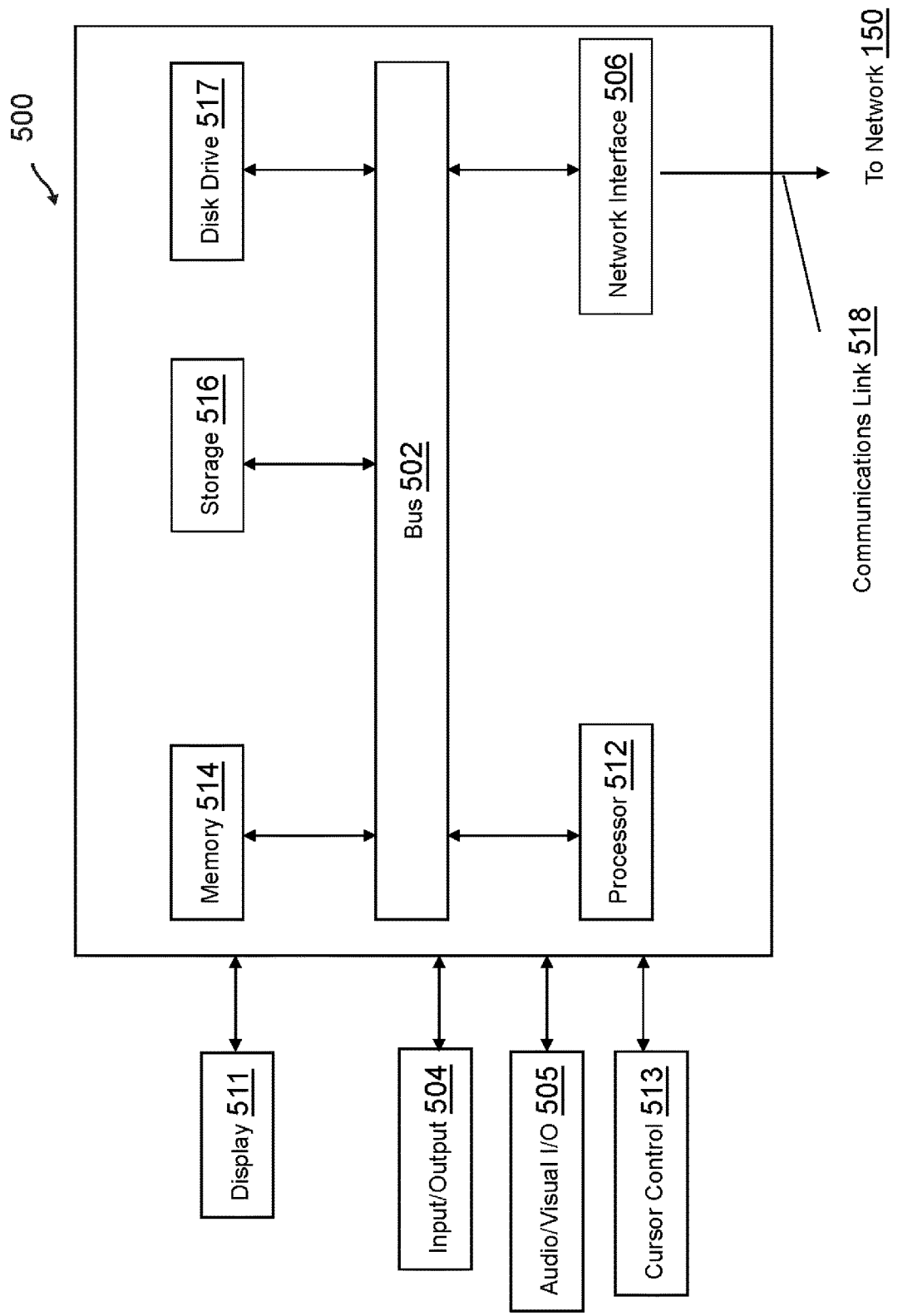
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
accessing a chat dialogue between a user and a chat service of a customer relationship management (CRM) system for a service provider associated with the system, wherein the chat dialogue comprises a plurality of words in a plurality of word groupings;
determining a past chat dialogue between the user and an assistance type provided to the user via a communication channel for the chat service of the CRM system, wherein the past chat dialogue indicates the assistance type previously used by the user and one or more named entities interacted with by the user, wherein the assistance type is associated with a service application provided by the service provider for use by the user, and wherein communication channel provides digital communications for the chat service of the CRM system;
performing a named entity recognition (NER) operation on the plurality of words using a machine learning (ML) model trained based on the assistance type and the communication channel, wherein the NER operation identifies the one or more named entities in the chat dialogue based on one or more of the plurality of words;
determining an interaction with the one or more named entities by the user and a time associated with the interaction based on the performing the NER operation and the chat dialogue;
determining one or more labels for the one or more named entities, wherein the one or more labels are specific to the assistance type and the communication channel;
determining additional data for the one or more named entities based the one or more labels and the interaction at the time, wherein the additional data includes one or more past interactions at one or more past times by the user with the merchant that correspond to the interaction;
generating a description of the one or more named entities in a format compatible with a user interface displaying visual chat data for the chat dialogue based on the interaction and the additional data; and outputting the visual chat data having the one or more named entities marked with the one or more labels and selectable to view the description, wherein the visual chat data comprise one or more processes to view the additional data for the one or more named entities in the chat dialogue.

2. The system of claim 1, wherein the visual chat data comprise one or more highlights of the one or more named entities over text in the chat dialogue corresponding to the one or more named entities.

3. The system of claim 1, wherein the operations further comprise:
receiving a selection of a first identification from the visual chat data;
obtaining the additional data for a corresponding named entity of the one or more named entities associated with the first identification; and
displaying the additional data with the corresponding named entity in the chat dialogue.

4. The system of claim 3, wherein the additional data is obtained from a proprietary database of the service provider that comprises customer data for customers of the service provider, and wherein the corresponding named entity comprises one of the customers.

5. The system of claim 3, wherein the additional data is obtained from an online search using an identifier of the corresponding named entity, and wherein the additional data comprises at least one of social networking data, financial standing data, website reputational data, or business data.

6. The system of claim 1, wherein the visual chat data correspond to one or more different types of named entities and are displayed in at least one of a different color or a different format in the chat dialogue.

7. The system of claim 1, wherein prior to the performing the NER operation, the operations further comprise:
determining an identification frequency of the one or more named entities in the chat dialogue that was established for at least one of the chat dialogue or the chat service,
wherein the NER operation is performed based on the identification frequency.

8. The system of claim 1, wherein prior to the performing the NER operation, the operations further comprise:
filtering at least one of automated chat replies or scripted chat statements from the chat dialogue.

9. The system of claim 1, wherein the chat dialogue comprises text between the user and at least one of a live agent or a chatbot for the chat service.

10. A method comprising:
receiving chat text by a user with a customer relationship management platform of a service provider, wherein the chat text comprises a plurality of words;
determining a past chat text by the user with the customer relationship management platform and an assistance type previously provided to the user via a communication channel for the customer relationship management platform, wherein the past chat text indicates the assistance type previously used by the user and a first named entity interacted with by the user, wherein the assistance type is associated with a service application provided by the service provider for use by the user, and wherein communication channel provides digital communications for the chat test from of the customer relationship management platform;
identifying the first named entity in the chat text using named entity recognition (NER) of a natural language processor comprising a machine learning (ML) model trained based on the assistance type and the communication channel, wherein the first named entity comprises one or more of the plurality of words in the chat text;
determining an interaction with the first named entity by the user based on the chat text;
determining a first label of the first named entity using the NER of the natural language processor, wherein the first label is specific to the assistance type and the communication channel;
determining a description of the first named entity using at least one of service provider data for the service provider or a search engine response to a search of the first named entity, wherein the description includes the interaction and one or more past interactions corresponding to the interaction;
highlighting the first named entity in the chat text with the first label, wherein the highlighting enables the first named entity to be selected to view the description;
receiving a selection of the highlighted first named entity; and
displaying the description of the first named entity in response to the selection via a user interface displaying the chat text.

11. The method of claim 10, further comprising:
determining that the chat text further comprises a plurality of second named entities having a plurality of second labels using the NER of the natural language processor.

12. The method of claim 11, wherein at least one of the first named entity or one or more of the plurality of second named entities are highlighted using a different highlighting based on types of the first label or the plurality of second labels.

13. The method of claim 11, wherein prior to the determining that the chat text further comprises the plurality of second named entities, the method further comprises:
determining a number or a frequency to highlight the first named entity and the plurality of second named entities in the chat text,
wherein the first named entity and the plurality of second named entities are limited for highlight by the number or the frequency.

14. The method of claim 13, wherein the number or the frequency is tunable by one of a system administrator for the customer relationship management platform or a live agent viewing the chat text.

15. The method of claim 10, wherein the highlighting comprises applying a colored highlight over the first named entity in the chat text, and wherein the colored highlight is specific to at least one of the first label or the description.

16. The method of claim 10, wherein the description comprises at least one of user information, financial information, an online web address, a certificate of standing, a fraud description, a shipping address, a billing address, or an item description.

17. The method of claim 10, wherein the service provider data comprises proprietary data for the service provider based on a computing service provided by the service provider to customers of the service provider.

18. The method of claim 10, wherein the displaying the description comprises populating the description in a pop-up window or a text bubble display associated with the first named entity in the chat text.

19. A non-transitory machine-readable medium having stored thereon machine-readable instructions executable to cause a machine to perform operations comprising:

highlighting, in a display of a computing device for a live agent of a customer relationship management system of a service provider, a portion of text in a dialogue between a user and the customer relationship management system using named entity recognition (NER) for a natural language processing system comprising a machine learning (ML) model trained based on an assistance type and a communication channel associated with the dialogue, wherein the highlighted portion of the text comprises a named entity with one or more labels, and wherein the highlighted portion is selectable to cause a display of a description of the named entity;

determining an interaction with the named entity by the user based on the dialogue;

determining a past dialogue between the user and the assistance type previously provided to the user via the communication channel for the customer relationship management system, wherein the past dialogue indicates the assistance type previously used by the user and the named entity interacted with by the user, wherein the assistance type is associated with a service application provided by the service provider for use by the user, and wherein communication channel provides digital communications for the dialogue from of the customer relationship management system;

determining information for the one or more labels for the highlighted portion, wherein the information for the one or more labels are specific to the assistance type and the communication channel;

generating description data for the named entity based on the assistance type and the information for the one or more labels, wherein the description data includes information indicating the interaction and a past interaction associated with the past dialogue;

receiving a selection of the highlighted portion of the text from the live agent in the display;

determining the description data for the named entity responsive to the selection; and displaying the description data in the display with the highlighted portion of the text.

20. The non-transitory machine-readable medium of claim 19, wherein prior to the highlighting, the operations further comprise:

determining that the portion of the text includes the named entity using the NER for the natural language processing system.

* * * * *